US008866646B2

(12) United States Patent
Frederiksen et al.

(10) Patent No.: US 8,866,646 B2
(45) Date of Patent: Oct. 21, 2014

(54) MEMORY COMPRESSION TECHNIQUE WITH LOW LATENCY PER PIXEL

(71) Applicant: Apple Inc., Cupertino, CA (US)

(72) Inventors: Jeffrey E. Frederiksen, Sunnyvale, CA (US); Michael Frank, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 169 days.

(21) Appl. No.: 13/743,544

(22) Filed: Jan. 17, 2013

(65) Prior Publication Data

US 2013/0129246 A1   May 23, 2013

Related U.S. Application Data

(63) Continuation of application No. 12/872,500, filed on Aug. 31, 2010, now Pat. No. 8,378,859.

(60) Provisional application No. 61/365,256, filed on Jul. 16, 2010.

(51) Int. Cl.
*H03M 7/30* (2006.01)
*G06K 9/36* (2006.01)
*G06T 9/00* (2006.01)
*H04N 9/67* (2006.01)
*H04N 19/146* (2014.01)

(52) U.S. Cl.
CPC ............ *G06K 9/36* (2013.01); *H04N 19/00169* (2013.01); *G06T 9/007* (2013.01); *G06F 2212/401* (2013.01); *H04N 9/67* (2013.01)
USPC ............................... 341/51; 382/240; 382/248

(58) Field of Classification Search
None
See application file for complete search history.

(56) References Cited

U.S. PATENT DOCUMENTS

| 4,990,925 | A | | 2/1991 | Edelsohn et al. | |
|---|---|---|---|---|---|
| 5,159,336 | A | * | 10/1992 | Rabin et al. | ............ 341/51 |
| 6,101,279 | A | | 8/2000 | Nguyen et al. | |
| 6,289,131 | B1 | | 9/2001 | Ishikawa | |
| 7,352,298 | B2 | | 4/2008 | Monro | |
| 7,683,908 | B2 | | 3/2010 | Pan et al. | |

(Continued)

FOREIGN PATENT DOCUMENTS

| JP | 2009124518 | | 6/2009 |
|---|---|---|---|
| JP | 2009124518 | A * | 6/2009 |
| TW | 200733735 | | 9/2007 |

OTHER PUBLICATIONS

U.S. Appl. No. 13/718,442, filed Dec. 18, 2012, Albert C. Kuo.

*Primary Examiner* — Howard Williams
(74) *Attorney, Agent, or Firm* — Lawrence J. Merkel; Meyertons, Hood, Kivlin, Kowert & Goetzel, P.C.

(57) ABSTRACT

In an embodiment, a compression unit is provided which may perform compression of images with low latency and relatively little hardware. Similarly, a decompression unit may be provided which may decompress the images with low latency and hardware. In an embodiment, the transmission of compressed coefficients may be performed using less than two passes through the list of coefficients. During the first pass, the most significant coefficients may be transmitted and other significance groups may be identified as linked lists. The linked lists may then be traverse to send the other significance groups. In an embodiment, a color space conversion may be made to permit filtering of fewer color components than might be possible in the source color space.

18 Claims, 9 Drawing Sheets

(56) References Cited

U.S. PATENT DOCUMENTS

| | | |
|---|---|---|
| 8,378,859 B2 | 2/2013 | Frederiksen et al. |
| 2003/0169936 A1 | 9/2003 | Zandi et al. |
| 2004/0012686 A1 | 1/2004 | Ono et al. |
| 2006/0140491 A1* | 6/2006 | Schwartz ............... 382/232 |
| 2006/0153291 A1* | 7/2006 | Christison ........... 375/240.01 |
| 2007/0067598 A1 | 3/2007 | Fujimoto |
| 2009/0123085 A1 | 5/2009 | Yoshimura et al. |
| 2009/0196494 A1 | 8/2009 | Kanai |
| 2009/0285480 A1 | 11/2009 | Bennett et al. |
| 2009/0324068 A1 | 12/2009 | Yamakawa |
| 2010/0053153 A1 | 3/2010 | Baril et al. |
| 2010/0245383 A1 | 9/2010 | Tsai |
| 2010/0290522 A1 | 11/2010 | Otani |
| 2012/0014595 A1 | 1/2012 | Frederiksen et al. |

* cited by examiner $$Y = (R + 2G + B + 2) >> 2$$
$$U = B - Y = B - ((R + 2G + B + 2) >> 2)$$
$$V = R - Y = R - ((R + 2G + B + 2) >> 2)$$

MEMORY COMPRESSION TECHNIQUE WITH LOW LATENCY PER PIXEL

This application is a continuation of U.S. patent application Ser. No. 12/872,500, filed on Aug. 31, 2010, which claims benefit of priority under 35 U.S.C. §119(e) of U.S. Provisional Patent Application Ser. No. 61/365,256, filed on Jul. 16, 2010. The above applications are incorporated herein by reference in their entireties. To the extent that anything in the provisional application conflicts with material expressly set forth herein, the material herein controls.

BACKGROUND

1. Field of the Invention

This invention is related to the field of memory compression for images.

2. Description of the Related Art

Visual images captured and/or displayed by an electronic device are often characterized by a significant memory footprint (i.e. the amount of memory consumed to store data representing the image). As the resolution of the images increases, the memory footprint of the image increases. Various electronic devices are expected to be capable of processing such images. For example, mobile electronic devices such as mobile telephones and personal digital assistants are often equipped with cameras to take still photographs, or even video. While current image capture sensors included in such devices are capable of about 2-4 megapixels, the sensors included in newer phones will continue to increase in resolution. Additionally, such devices are being equipped with higher resolution screens, and thus the footprint of images for display also increases. Such devices may also be designed to output high resolution images/video to an external device, and the footprint of the high resolution images is large.

While the size of memory in such devices is also increasing over time, the size of the memory is not increasing at the same rate as the image size. Additionally, such devices are increasingly providing significant functionality for other purposes. For example, smart phones are beginning to provide multi-threaded processing to support multiple applications executing on the phone concurrently. Each application consumes memory for the code being executed and the data being operated upon, which places further pressure on the memory capacity. Furthermore, the applications compete for access to the memory (e.g. bandwidth), which pressures the interconnect between the memory and the memory controller, and between the memory controller and the other devices in the system such as the processors, graphics devices, display controllers, etc.

Images can be transmitted and stored in compressed form. However, during image capture and display, the time and hardware required to compress and decompress images is often prohibitive. For example, a typical JPEG or H.254 frame may require about 50 clock cycles per pixel and substantial hardware.

SUMMARY

In an embodiment, a compression unit is provided which may perform compression of images with low latency and relatively little hardware. Similarly, a decompression unit may be provided which may decompress the images with low latency and little hardware. Such compression/decompression hardware may permit the real time use of compression on images in a system, which may reduce the memory footprint of the images. Bandwidth pressure on the interconnect between the memory and various devices that manipulate images may be lessened, as may competition for memory space between the image data and other data stored in the memory. In one implementation, the compression/decompression hardware may be configured to compress a tile of about 1000 pixels in about 2 clock cycles per pixel, on average, using hardware that is on the order of 10 times smaller (e.g. in terms of transistors) than hardware for handling JPEG or H.254 frames. Other implementations may achieve different results in terms of average clock cycles per pixel and hardware size, and may operate on different sized tiles.

In an embodiment, color space conversions may be used to reduce the number of color components that may be filtered by filtering hardware and/or software. For example, a red-green-blue (RGB) representation of each pixel may be converted to a YUV representation of the pixel. Most of the image information may lie in the Y component, which may be filtered. The filtered Y component and the unfiltered U and V components may then be converted back to the RGB representation, which may closely approximate the result of filtering each of the R, G, and B components. In another embodiment, a Bayer sensor output may be converted to a YUVW format (and the Y component may be filtered).

BRIEF DESCRIPTION OF THE DRAWINGS

The following detailed description makes reference to the accompanying drawings, which are now briefly described.

FIG. 12 is a diagram illustrating one embodiment of an image data format conversion.

Figure 1:
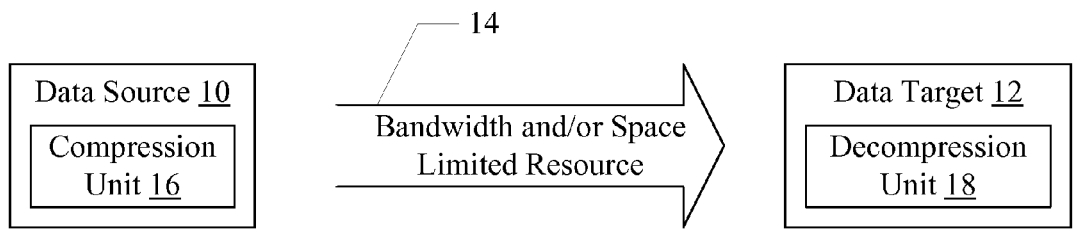
FIG. 1 is a block diagram of one embodiment of a generic data source and data target using compression and decompression.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not intended to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram is shown of a generic data source 10 and a generic data target 12 coupled via a channel 14 that includes at least one bandwidth-limited and/or space-limited resource. The data source 10 includes a compression unit 16, and the data target 12 includes a decompression unit 18.

Generally, the data source 10 may be configured to transfer data over the channel 14 to the data target 12. The data source 10 may generate the data (e.g. the data source 10 may be a sensor, such as a camera for graphical images), or may receive the data from other circuitry and may optionally process the data to transform the data in some defined fashion. The data source 10 may then compress the data using the compression unit 16. Generally, the compression may itself be a transformation of the data, reducing the size of the data in the transformation.

Compression may be lossless or lossy. With lossless compression, the original data may be recovered in its exact form after compression and subsequent decompression. Accordingly, lossless compression algorithms may focus on removing redundancy in the original data and encoding the data more efficiently, but in a fashion that retains all information content. For example, a long consecutive string of the same value in the data can be replaced with a more efficient coding such as a count of the number of instances of the value followed by one instance of the value itself. In lossy compression, the decompressed data (resulting from compressing the original data and decompressing the compressed data) is an approximation of the original data. Particularly with graphical images, lossy compression may produce decompressed images that are virtually indistinguishable from the original image when viewed by the human eye, even though the decompressed images have lost some of the content that represents the image. Alternatively, lossy compression may result in decompressed images having noticeable differences from the original image, but the differences may be considered acceptable to the viewer.

By compressing the data and transferring the compressed data over the channel 14, the data source 10 may consume less of the available bandwidth and/or storage space in the channel 14. For example, the channel 14 may include one or more interconnects over which the data is transmitted. Each interconnect may have a maximum bandwidth, and at least some of the interconnect bandwidths may be insufficient to support transmission of the uncompressed data in "real time." That is, the uncompressed data may be generated or received by the data source 10 at a particular rate. If the bandwidth available to the data source 10 is less than the rate, then the uncompressed data cannot be transmitted without stalling, or backpressuring, the data generation/receipt rate. In some cases, it may not be acceptable to stall the data generation/receipt rate. For example, if the data source 10 is a camera sensor, the data representing an image must be transmitted before the sensor captures the next image. If the data source 10 is providing video, the images are being transmitted at a particular frame rate and stalling leads to lost frames.

In addition to bandwidth limitations, space limitations may present issues to transmitting the uncompressed data. For example, the channel 14 may include local memory buffers and/or a main memory system in the device that includes the data source 10 and the data target 12. The size of the data in memory (it's "footprint") may consume all of the available memory, or a sufficiently large portion of the memory that other data is crowded out of the memory.

Even in cases in which the bandwidth and space characteristics of the channel 14 are sufficient to handle the uncompressed data, higher performance in the system overall (in which other activities are being performed beyond the transfer of data from the data source 10 to the data target 14 which may need access to the channel 14) may be achieved by reducing the load of the data source 10 on the channel 14.

The decompression unit 18 is configured to reverse the operation of the compression unit 16, producing the original uncompressed data or an approximation thereof. That is, the decompression unit 18 is designed with an awareness of the compression algorithm used by the compression unit 16. Additionally, if parameters of the compression algorithm are programmable, both the compression unit 16 and the decompression unit 18 are programmed in the same fashion to ensure that the decompression unit 18 properly interprets the received data.

In the case of image data, the frame of data that represents the image has a spatial relationship. The frame of data may, for example, represent the colors of a set of pixels arranged in a two dimensional format. Within a frame, a tile may be defined which includes a subset of the pixels. The size of the tile, e.g. the number of pixels, may be configurable. One implementation of the compression unit 16/decompression unit 18 may provide good compression ratios with good image results for about 1000 to 2000 pixels per tile. Thus, for example, tiles of 32 pixels horizontal by 32 pixels vertical (32×32) may be defined and such tiles include 1024 pixels. Additionally, the shape of the tile may be varied in various embodiments. For example, square or rectangular tiles may be defined. Thus, a 1024 pixel tile may be 32×32, 64×16, 128×8, 256×4, etc. In tile-based implementations, each tile may be compressed as a unit and the compressed tile may be transmitted and decompressed. In another implementation, good compression results may be achieved with smaller tiles (e.g. 64 pixel tiles, in a 16×4 arrangement). Larger tiles may also be used (e.g. tiles with more than 2000 pixels) in other implementations.

Applying the compression algorithm to a tile of data may include one or more transforms applied to the data, transforming the data into a form in which at least some of the transformed data becomes zero or near-zero. For example, in one embodiment, one or more wavelet transforms may be used. In one implementation, a Haar wavelet may be applied with the coefficients [1], [1]. In another implementation, multiple wavelets may be applied in succession, including for example: Deslauriers-Dubuc (9,7) with the coefficients [1,1], [−1,9,9,−1]; LeGall (5,3) with the coefficients [1,1],[1,1]; Deslauriers-Dubuc (13,7) with the coefficients [−1,9,9,−1],[−1,9,9,−1]; and Haar with the coefficients [1],[1]. With coefficients of one and nine, and treating nine as one and eight, there may be no need for multipliers in the compression unit 16 and decompression unit 18. That is, the computations may be performed using shifters and adders. Other embodiments may implement any other transforms or a combination of transforms. For example, a discrete cosine transform may be used (or it's integer equivalent). An RGB to YUV transform, discussed below, may be used.

The data resulting from transforming the uncompressed data via one or more transforms are referred to as coefficients. A coefficient may have an associated significance, based on the magnitude of the coefficient with respect to zero. For example, the coefficients resulting from the wavelet transformations discussed above may be positive signed integers. Accordingly, the most significant set bit in the coefficient may be viewed as a measure of significance of the coefficient. Coefficients have their most significant set bits in the same bit position may be referred to as a significance group. A first coefficient may be referred to as more significant than a second coefficient if the first coefficient has its most significant set bit in a more significant bit position than the bit position in which the second coefficient has its most significant set bit. Alternatively, both positive and negative signed integers may be included in the coefficients. In such a case, the most significant set bit may indicate the significance group if the integer is positive (sign bit is zero). If the integer is negative (sign bit is one), two or more most significant bits may be set. The coefficients having the same field of most significant set bits may be included in the same significance group in such embodiments.

The compression unit 16 may order the coefficients according to the areas of data most likely to have significant coefficients, resulting in an ordered list. The order is discussed in more detail below for one embodiment. The compression unit 16 may then scan the ordered list, searching for the most significant coefficients (i.e. those coefficients having the most significant bit set) and may transmit the most significant coefficients to the data target 12. Additionally, during the scan, the compression unit 16 may generate linked lists of coefficients for each other significance group. That is, for each bit in the coefficients, a linked list may be generated with pointers to the coefficients having that bit as the most significant set bit, thus forming the significance groups as the members of each linked list. Accordingly, each coefficient may be included in only one significance group.

In this manner, the list of coefficients may only be scanned in full one time. The linked list of coefficients for each other significance group may be traversed, limiting the visiting of each remaining value to one time. Thus, the number of scans through the list is less than two, and may be close to one. For example, about 1¼ scans of the list may be sufficient to send all coefficients, in an embodiment. Specifically, in one embodiment, the more significant coefficients may be clustered in one area of the compressed tile, with other significant coefficients appearing in small numbers in the other areas.

A coefficient may be "sent" by the compression unit 16 by sending a location of the coefficient followed by the value of the coefficient (e.g. as a signed integer). For example, the address of the coefficient in the coefficient list may be sent as the location (or the difference in the address from the previously-sent address, referred to herein as a "delta address", for each coefficient after the first coefficient). Other embodiments may identify the location in other ways (e.g. as a pixel address within the tile or within the image). In one embodiment, the coefficient list delta address may be transmitted using an exponential coding such as the exponential Golomb code. An exponential Golomb code sends small magnitude numbers (near zero) efficiently but higher magnitude numbers inefficiently. Accordingly, since the coefficient list delta address is small, the exponential Golomb code may send the addresses efficiently.

For example, an exponential Golomb code may be defined as follows: An exponential-Golomb code of order k is a type of universal code parameterized by a whole number k. To encode a nonnegative integer in an order-k exponential-Golomb code, one can use the following method: (1) Take the number in binary except for the last k digits and add 1 to it (arithmetically); (2) Count the bits from step (1), subtract one, and begin the code with that number of starting zero bits preceding the previous bit string; (3) code the last k bits in binary. For example, if k=0 the code begins:

```
0 => 1 => 1
1 => 10 => 010
2 => 11 => 011
3 => 100 => 00100
4 => 101 => 00101
5 => 110 => 00110
6 => 111 => 00111
7 => 1000 => 0001000
8 => 1001 => 0001001
etc.
```

In one embodiment, the compression unit 16 may be configured to convert the initial binary two's complement representation of the coefficients to signed magnitude coefficients. The most significant coefficients are sent initially, followed in order by the less significant coefficients until all coefficients are sent or until transmission is terminated early due to lack of space (e.g. in a receiving buffer) or time. In an embodiment, the most significant bit of the coefficient value is not sent since it is always a one. The remaining bits may be sent for each coefficient value. In an embodiment, the sign bit may be sent for each coefficient value when one exists. However, in the exemplary embodiment using wavelet transforms, the sign bit does not exist for coefficients in the LL plane. Alternatively, negative coefficient values may be sent as a separate significance group. For example, in an embodiment, the negative significant group may be sent after (or before) the equivalent significance group of positive values. In such an embodiment, the sign may be implicit.

After the initial coefficient is sent, the delta address to the next most significant coefficient may be sent followed by that coefficient. As mentioned above, the delta address may be the difference between the previous coefficient address and the current coefficient address. In one embodiment, the delta address may be the difference between the previous coefficient address and the current coefficient address, minus one. In such an embodiment, the delta address for adjacent coefficients is zero. Thus, by clustering coefficients of the same significance group in the coefficient list, the delta address may frequently be zero. Accordingly, the delta address may generally be zero or a small positive number, which may be encoded efficiently in the exponential Golomb code. The transmission of delta addresses and coefficient values may continue until all of the coefficients in the current significance group have been sent. The end of the significance group may be signalled to the decompression unit 18 in some fashion. For example, the end of the significance group may be signalled by sending a last delta address that points to an address beyond the length of the coefficient list. Alternatively, the delta address may be calculated as a delta address, modulo the length of the coefficient list, to the initial coefficient of the next significance group. The decompression unit 18 may be configured to detect the rollover from the end of the list to the beginning of the list again, and thus may detect that the next significance group is starting. Such an embodiment may avoid sending two addresses, one to terminate the significance group and one to start the next significance group. The remaining coefficients in other significance groups may be sent in a similar fashion until all non-zero coefficients are sent. Any coefficient not sent may be assumed to be zero by the decompression unit 18.

The decompression unit 18 may be configured to receive the compressed data. If the decompression unit 18 receives the data over a communication channel directly from the compression unit 16 without being stored in a memory system as a whole, the decompression unit 18 may be configured to assemble the data into the compressed image. The decompression unit 18 may be configured to apply the inverse of the wavelet transforms in reverse order of their application to restore the original image data (or an approximation thereof).

While the embodiment of FIG. 1 shows a data source and a data target with respective compression and decompression units, there may be multiple sources that compress data, and there may be multiple targets that decompress data. Data may be decompressed, manipulated, and compressed again in various circuitry.

Figure 2:
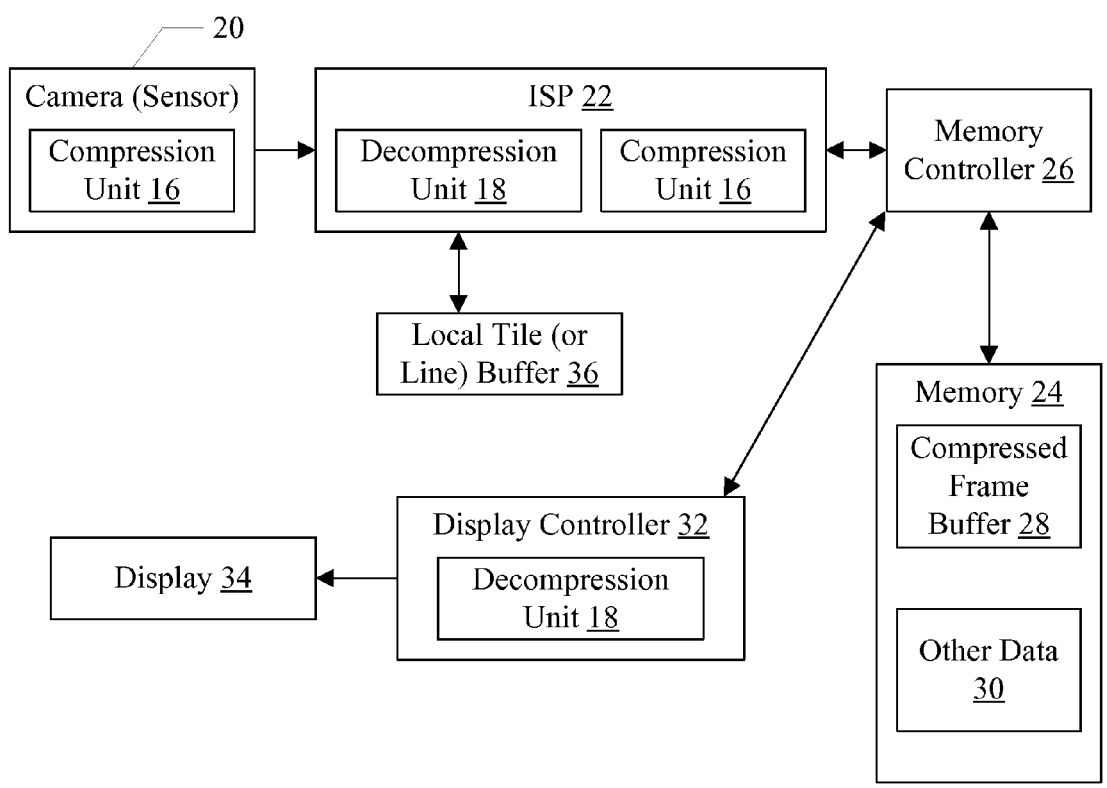
FIG. 2 is a block diagram of a more detailed embodiment using compression and decompression.

FIG. 2 is a more detailed embodiment of a system that may employ compression and decompression units. In the embodiment of FIG. 2, a camera sensor 20 is shown including an instance of the compression unit 16 and transmitting the compressed data to an image signal processor (ISP) 22, which includes an instance of the decompression unit 18 and an instance of the compression unit 16. The ISP 22 may be configured to transform the camera sensor data and to compress the transformed data to be written to a memory 24 through a memory controller 26. The transformed data is illustrated as the compressed frame buffer 28. The memory 24 may store other data 30 as well. For example, data 30 may include one or more of the following: instructions to be executed on a processor, application data for applications being executed in the system, other images, etc. The compressed frame buffer 28 may be read through the memory controller 26 by a display controller 32, which may include an instance of the decompression unit 18. The display controller 32 may be coupled to a display 34. In various embodiments, one or more of the components illustrated in FIG. 2 may be integrated together on an integrated circuit (and other components, not shown, may be integrated on the integrated circuit as well). For example, in embodiment includes the ISP 22, the memory controller 26, and a portion of the display controller 32 integrated onto the integrated circuit. The other components may be included in a system with the integrated circuit. For example, the system may be a mobile device such as a cellular telephone, smart phone, personal digital assistant, or tablet computer in various embodiments. Other embodiments may be other types of digital systems such as laptops, desktops, or net tops.

The camera 20 may be any type of image sensor. The output of the camera 20 may be a set of pixels sensed by the camera 20, forming an image. The image may not yet have been processed for sensor saturation compensation or other compensation and/or enhancement. The camera 20 may include the compression unit 16, which may be configured to compress the sensed image and transmit the compressed image to the ISP 22. The ISP 22 may be configured to decompress the sensed image in the decompression unit 18, perform the desired image compensation and/or enhancement, and compress the resulting image in the compression unit 16 to be transmitted to the memory controller 26. In some embodiments, the ISP 22 may implement a local tile (or line) buffer to store decompressed frame data for processing and compression. If the buffer 36 is a tile buffer, one or more tiles may be retained in the tile buffer for manipulation and subsequent update to memory. If the buffer 36 is a line buffer, one or more lines of an image may be retained. The ISP 22 may decompress, process, compress, and transmit on a tile-by-tile (or line-by-line) basis as the compressed tiles are received from the camera sensor 20. In one embodiment, the camera sensor 20 and the ISP 22 may operate on scan lines of images, and thus a wide (horizontal), short (vertical) tile may be used (e.g. 128×8 or 256×4). In some embodiments, the ISP 22 may perform some processing prior to decompression (e.g. while the image data is still in wavelet space). For example, embodiments may perform binary scaling, noise reduction, and/or defective pixel correction prior to decompression.

The memory controller 26 may be configured to receive write operations from the ISP 22, and to write the compressed data to the compressed frame buffer 28. In an embodiment, the compressed frame buffer 28 may be smaller than a full size frame buffer that would be capable of storing the uncompressed frame. In another embodiment, the full size frame buffer may be allocated but may store the compressed data. It is statistically possible, but unlikely, that the losslessly compressed data could be larger than the full-size tile data. In this case, the system may mark (or flag) the tile and store the original uncompressed data. Any mechanism for flagging the tile may be used (e.g. saving the address of such a tile). Lossy compressed data may be made to fit in the allocated space by accepting additional loss in the data. Generally, the memory controller 26 may be configured to couple to a high level interface such as a bus or point-to-point interconnect to receive read and write memory operations, and may be configured to communicate on a lower level interface to the memory devices forming the memory 24. The memory 24 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit including the memory controller 26 in a chip-on-chip configuration, a package-on-package configuration, or a multi-chip module configuration.

The display controller 32 may be configured to read the compressed frame buffer 28 to display the frame on the display 34. The display controller 32 may thus include the decompression unit 18 to decompress the compress frame buffer data. The display controller 32 may include circuitry configured to blend image data from multiple frames to produce a frame for display. The display controller 32 may further include the interface hardware to interface with the display 34. The display 34 may include any type of display screen (e.g. liquid crystal display (LCD), cathode ray tube (CRT), thin film transistor (TFT), plasma display, etc). The display 34 for a mobile device may include touch screen functionality.

It is noted that other devices in the system may operate on image data and may implement the compression/decompression units 16 and 18. For example, graphics controllers may be included to render a scene for display. The rendered frame may be compressed for storage in the memory 24 and decompressed for display. Any circuitry which operates on images may use the compression described herein, as may any other type of data that is amenable to compression.

In an embodiment, the use of compression on the image data may permit the local tile/line buffer 36 to be integrated on an integrated circuit with the ISP 22 and other components. That is, the size of the local tile/line buffer 36 to store compressed tiles or lines may be small enough for integration where a local buffer to store uncompressed data may be too large for integration. The latency for accesses to the local tile/line buffer 36 may be lower than accesses to an off-chip memory, which may improve performance of the system in processing images.

Figure 3:
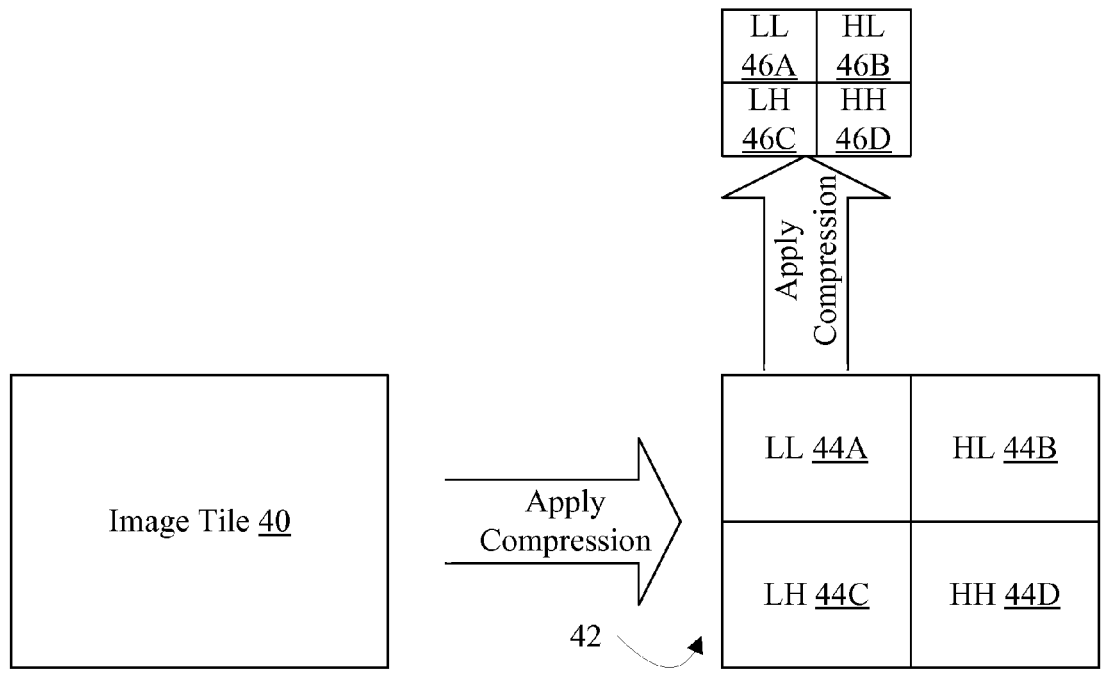
FIG. 3 is a block diagram illustrating one embodiment of an image tile being compressed.
Figure 4:
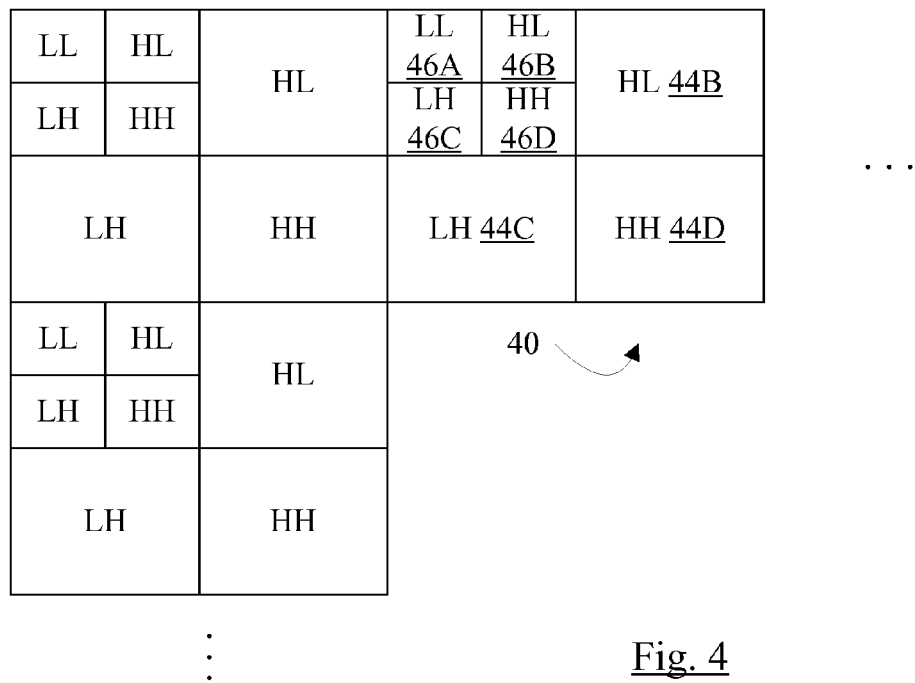
FIG. 4 is a block diagram illustrating multiple tiles of an image.

FIGS. 3 and 4 illustrate compression of tiles in an image according to one embodiment of the compression units 16. FIG. 3 is a block diagram of one embodiment of an image tile 40. Applying a transformation (e.g. a wavelet) to the image tile 40 may produce a transformed tile 42. The transformed tile 42 is divided into 4 quadrants 44A-44D labeled LL, HL, LH, and HH, respectively. The LL quadrant 44A may generally have the most significant coefficients. The HL, LH, and HH quadrants 44B-44D may be sparsely populated with significant coefficients, typically corresponding to pixels that form an edge between colors in the image. Remaining coefficients in these quadrants are typically zero or near zero. The HH quadrant 44D may tend to be the most sparsely populated with significant coefficients. The L and the H may generally refer to low frequency components and high frequency components in the transformation. The first "L" or "H" refers to the horizontal direction and the second "L" or "H" refers to the vertical direction.

The transformation may be applied again to the quadrant 44A, producing quadrants 46A-46D. Similar to the quadrants 44A-44D, the quadrants 46A-46D are labeled LL, HL, LH and HH respectively. The transformation of the LL quadrant resulting from a previous application of a transformation may be repeated as often as desired. At some point, the HL, LH, and HH quadrants become less sparsely (more densely) populated with significant coefficients. Accordingly, the number of iterations of applying the transformation may be capped based on the reduced compression return that additional iterations would provide. A cap of 4 iterations may be chosen, in an embodiment, although more or fewer iterations may be used in other embodiments. The number of iterations may also be varied dynamically based on the number of significant coefficients that appear in the HL, LH, and HH quadrants after each iteration.

While FIG. 3 separately illustrates the image tile 40, the transformed tile 42, and the transformed quadrant 44A (as the quadrants 46A-46D), the transformation may be performed within the same memory locations, overwriting the original data in the tiles. FIG. 4 illustrates several tiles including tile 40. The tiles may be part of a overall image. The original tile 40 has been replaced by the transformed tile 42, including the quadrants 44B-44C. The quadrant 44A has been replaced by its transformed representation (quadrants 46A-46D). Other tiles may similarly be replaced with their transformed representations.

Figure 5:
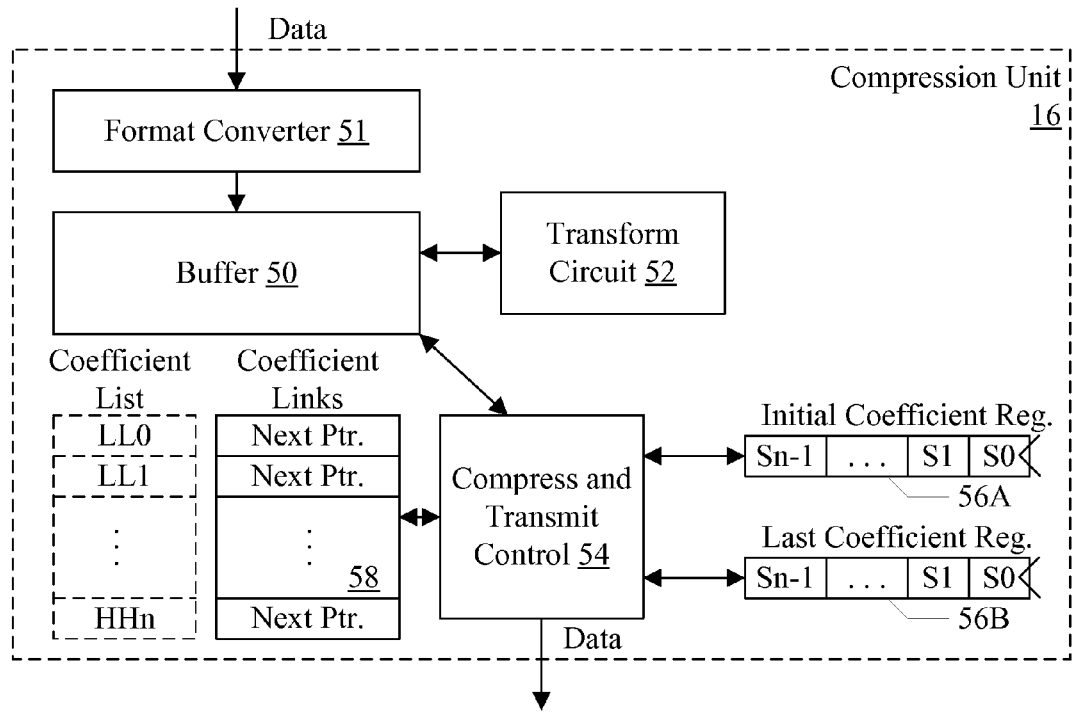
FIG. 5 is a block diagram of one embodiment of a compression unit.

Turning now to FIG. 5, a block diagram of one embodiment of the compression unit 16 is shown. In the embodiment of FIG. 5, the compression unit 16 includes a data buffer 50, a format converter circuit 51, a transform circuit 52, a compression and transmit control circuit 54, coefficient pointer registers 56A-56B and coefficient links memory 58. The data buffer 50 is coupled to receive data to be compressed (e.g. a tile of data), which may be transformed through the format converter circuit 51 in some embodiments, and is coupled to the transform circuit 52 and the compression and transmit control circuit 54. The compression and transmit control circuit 54 is coupled to provide compressed data for transmission, and is coupled to the coefficient links memory 58 and the coefficient pointer registers 56A-56B. Each of the registers 56A-56B may include several fields, labeled S0 to Sn−1 in FIG. 5 (where n is the number of bits in a coefficient). The field may store a pointer to an entry in the coefficient links memory 58 having a coefficient of the corresponding significance. For example, the most significant coefficient pointer is in the field Sn−1. The second least significant coefficient pointer is in the field S1, and the least significant coefficient pointer is in the field S0. The registers 56A-56B may include one or more registers as needed to provide storage for the pointers.

Each entry in the coefficient links memory 58 corresponds to a coefficient in the list of coefficients that form the compressed image. The list may be ordered beginning with the LL quadrant of the innermost compression (and with a predefined order of the LL coefficients within the quadrant, such as row-major or column-major) and proceeding through the other quadrants of each compression from innermost to outermost, reaching the HH quadrant of the outermost compression. The list is illustrated in dotted form next to the coefficient links memory 58 in FIG. 5 to represent the logical organization of the list. However, the coefficient list may physically be stored in the buffer 50 after the transformations performed by the transform circuit 52 have overwritten the original data with the transformed data, e.g. as illustrated in FIG. 4.

Operation of the compression unit 16 (and more particularly the transform circuit 52 and the compression and transmit control circuit 54, as appropriate) will be described in more detail with regard to the flowcharts illustrated in FIGS. 6 to 9. While the blocks are shown in a particular order for ease of understanding, other orders may be used. Blocks may be performed in parallel in combinatorial logic in the compression unit 16. Blocks, combinations of blocks, and/or the flowcharts as a whole may be pipelined over multiple clock cycles. The compression unit 16 may be configured to implement the operation illustrated by the flowcharts.

Figure 6:
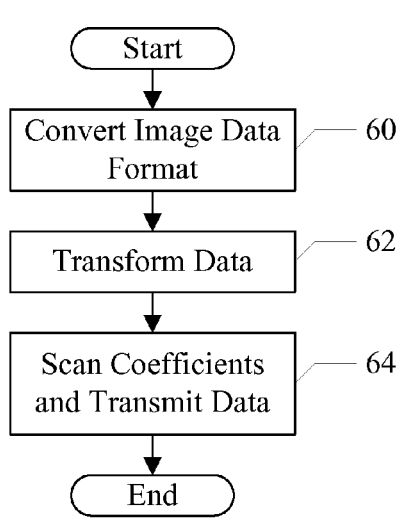
FIG. 6 is a flowchart illustrating operation of one embodiment of the compression unit.

FIG. 6 is a flowchart illustrating overall operation of the compression unit 16 in response to receiving data into the compression unit 16 (e.g. into the data buffer 50). The compression unit 16 (and more particularly the format converter circuit 51) may optionally be configured to convert a format of the data (block 60). For example, in one embodiment, the image data may be provided in red-green-blue (RGB) format. In RGB format, each pixel is represented as a red color value, a green color value, and a blue color value. For example, eight bits of each value may be provided, and thus a pixel may be represented by 24 bits. Other embodiments may implement other sizes for the color values. The RGB representation may be compressed (effectively compressing 3 images: one red, one green, and one blue). Alternatively, by converting to a different format, the compression efficiency of some images may be increased. For example, a YUV format may be used in one embodiment discussed in more detail below. For text, the U=B−Y and V=R−Y planes may be approximately zero and thus may compress away entirely or nearly entirely. Additional details are discussed below with regard to FIG. 12. It is noted that the transformation from RGB to YUV is optional and may not be used in other embodiments.

The transform circuit 52 may be configured to transform the data (block 62), overwriting each tile in the data buffer 52 with its transformed representation. The transform circuit 52 may be configured to apply several transform algorithms in succession (e.g. several wavelet transformations may be applied, as discussed above). The transform circuit 52 may have multiple parallel paths to generate multiple coefficients concurrently, and may even be configured to compute the complete tile of coefficients in parallel in some embodiments. The compression and transmit control circuit 54 may scan the coefficients and transmit the coefficients (i.e. the compressed data) (block 64).

Figure 7:
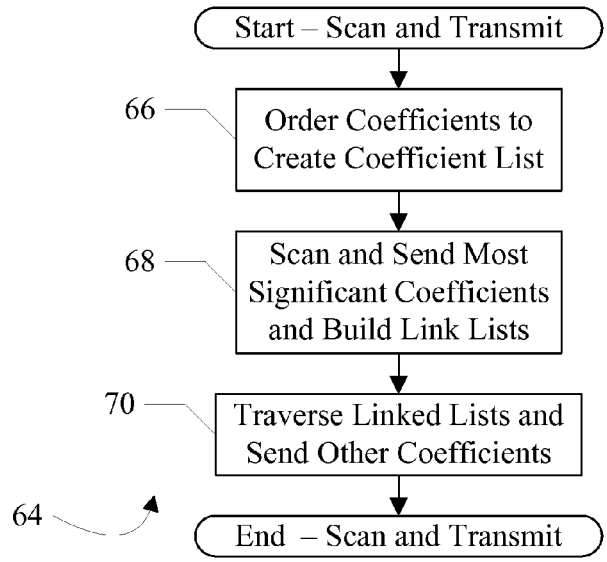
FIG. 7 is a flowchart illustrating additional detail of one embodiment of a scan and transmit block in FIG. 6.

FIG. 7 is a flowchart illustrating the scanning and transmitting of the coefficients (block 64) in more detail for one embodiment. The compression and transmit control circuit 54 may order the coefficients to create the coefficient list (block 66). The list may not be physically created by changing the order of the data in the data buffer 50, but rather the list may be created virtually be controlling the generation of addresses when scanning through the list so that the correct coefficients are addressed in the data buffer 50. Accordingly, block 66 may not be explicitly included in some embodiments. Specifically, the list may be ordered by selecting the coefficients in the LL quadrant of the innermost transformation, followed by the HL, LH, and HH quadrants. The HL, LH, and HH quadrants of the next innermost transformation may be selected, etc. until the HL, LH, and HH quadrants of the outermost transformation are selected. For example, in the image tile 40 shown in FIG. 4, the coefficients from the LL quadrant 46A may appear in the coefficient list first, followed by the coefficients from the HL quadrant 46B, the LH quadrant 46C, and the HH quadrant 46D. The coefficients from the HL quadrant 44B, LH quadrant 44C, and HH quadrant 44D may follow the coefficients from the quadrants 46A-46D in the list.

The compression and transmit control circuit 54 may be configured to scan the list searching for the most significant coefficients, and may also be configured to build a linked list of coefficients in other significance groups (block 68). That is, the compression and transmit control circuit 54 may search for coefficients having the most significant bit set (or most significant bits, for negative coefficients). Additionally, for each coefficient that is not in the most significant group, the compression and transmit control circuit 54 may identify the significance group for that coefficient and may add that coefficient to the linked list for that significance group. The coefficient links memory 58 may be used to store the pointers from each coefficient to the next coefficient in the list that is in the same significance group. That is, there may be an entry in the coefficient links memory 58 for each coefficient in the tile, and the entry may store a pointer to another entry in the list. The pointers may be referenced from the top of the list, and thus a number of bits in the pointer is controlled by a number of coefficients in the compressed data (e.g. 10 bits in the embodiments that include 1024 pixels per tile, 11 bits if 2048 pixels per tile are included, etc.). The initial coefficient pointer register 56A may store pointers to the initial coefficients in the list for each significance group, and the last coefficient pointer register 56B may store pointers to the most recently detected coefficient of each significance group in the list. The use of these pointers in building the list is discussed in more detail below.

Once the first pass through the list of coefficients is complete, the most significant coefficients have been transmitted and the linked lists for each other significance group have been created. The compression and transmit control circuit 54 may be configured to select each significance group in turn and to traverse the linked list to transmit the other coefficients from the other significance groups (block 70). It is noted that, in the first pass through the list of coefficients, all coefficients are scanned in this embodiment. Accordingly, multiple coefficients may be processed (transmitted, or linked into a linked list) in parallel (e.g. in the same clock cycle). Furthermore, some embodiments may transmit coefficients from more than one significance group during the first pass.

Figure 8:
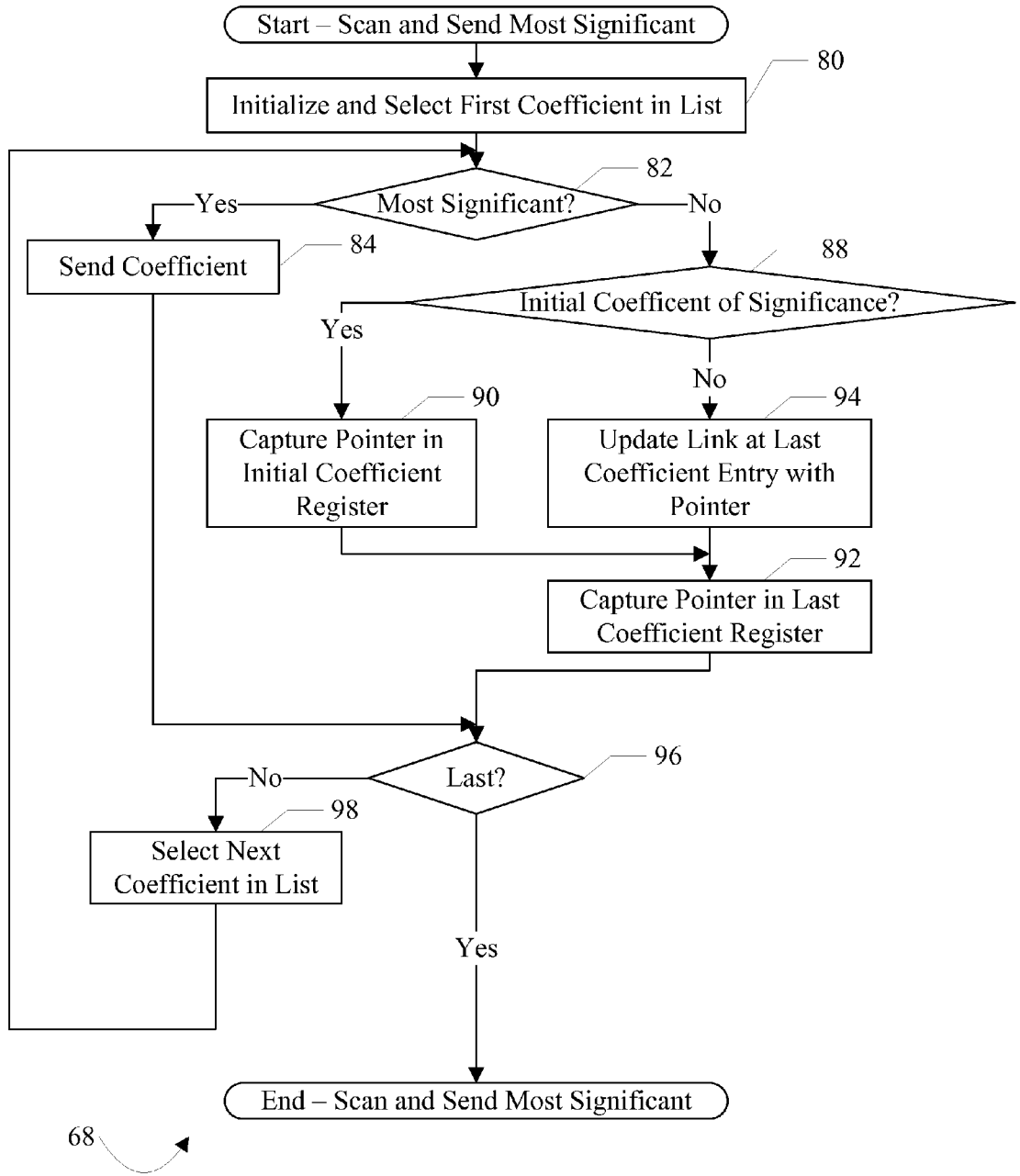
FIG. 8 is a flowchart illustrating additional detail of one embodiment of a scan and send most significant coefficient block shown in FIG. 7.

FIG. 8 is a flowchart illustrating, in more detail, one embodiment of scanning the coefficients, sending the most significant coefficients, and building the linked lists for other significance groups (block 68 from FIG. 7). The compression and transmit control circuit 54 may be configured to initialize its data structures and select the first coefficient in the list (block 80). Particularly, the compression and transmit control circuit 54 may set the coefficient pointer registers 56A-56B and the coefficient pointer memory 58 to null pointer values to signify that the pointers are not valid. The null pointer value may be represented in any fashion (e.g. one of the potential pointer values, such as zero or the number of pixels in a tile, may be defined as null; there may be a valid bit in addition to each pointer; etc.).

The compression and transmit control circuit 54 may be configured to determine if the selected coefficient is in the most significant significance group (decision block 82). If so (decision block 82, "yes" leg), the compression and transmit control circuit 54 may be configured to send the coefficient (block 84). The entire coefficient may be sent, not only the most significant bit.

If the selected coefficient is not in the most significant significance group (decision block 82, "no" leg), the compression and transmit control circuit 54 may determine if the selected coefficient is the initial coefficient detected for the significance group that the selected coefficient belongs to (decision block 88). For example, if the pointer in the initial coefficient pointer register 56A corresponding to the significance group is null, the selected coefficient may be the initial coefficient of the significance group. If so (decision block 88, "yes" leg), the compression and transmit control circuit 54 may capture the pointer to the selected coefficient in the initial coefficient pointer register 56A, thus initializing the linked list for that significance group (block 90). The initial coefficient pointer register 56B may also capture the pointer for use in updating the linked list when the next coefficient in that significance group is identified (block 92).

If the selected coefficient is not the initial coefficient in its significance group (decision block 88, "no" leg), the linked list for that significance group has been initialized, and the selected coefficient is to be added to the linked list. To do so, the compression and transmit control circuit 54 may be configured to update the link in the coefficient link memory 58, at the entry indicated by the last coefficient pointer register 56B, with a pointer to the selected coefficient (block 94). Additionally, the compression and transmit control circuit 54 may be configured to capture the pointer to the selected coefficient in the last coefficient pointer register 56A for that significance group (block 92).

If the compression and transmit control circuit 54 has reached the last entry in the list (decision block 96, "yes" leg), the scan, send, and build linked list block 68 is completed. If not (decision block 96, "no" leg), the compression and transmit control circuit 54 may be configured to select the next coefficient in the list (block 98) and to process the next coefficient in a similar manner (returning to decision block 82 in the flowchart).

It is noted the operation of the flowchart of FIG. 8 may be performed in parallel for multiple coefficients concurrently. In such an embodiment, updates to the registers 56A-56B may be fed forward in the logic circuitry to the subsequent coefficients.

Figure 9:
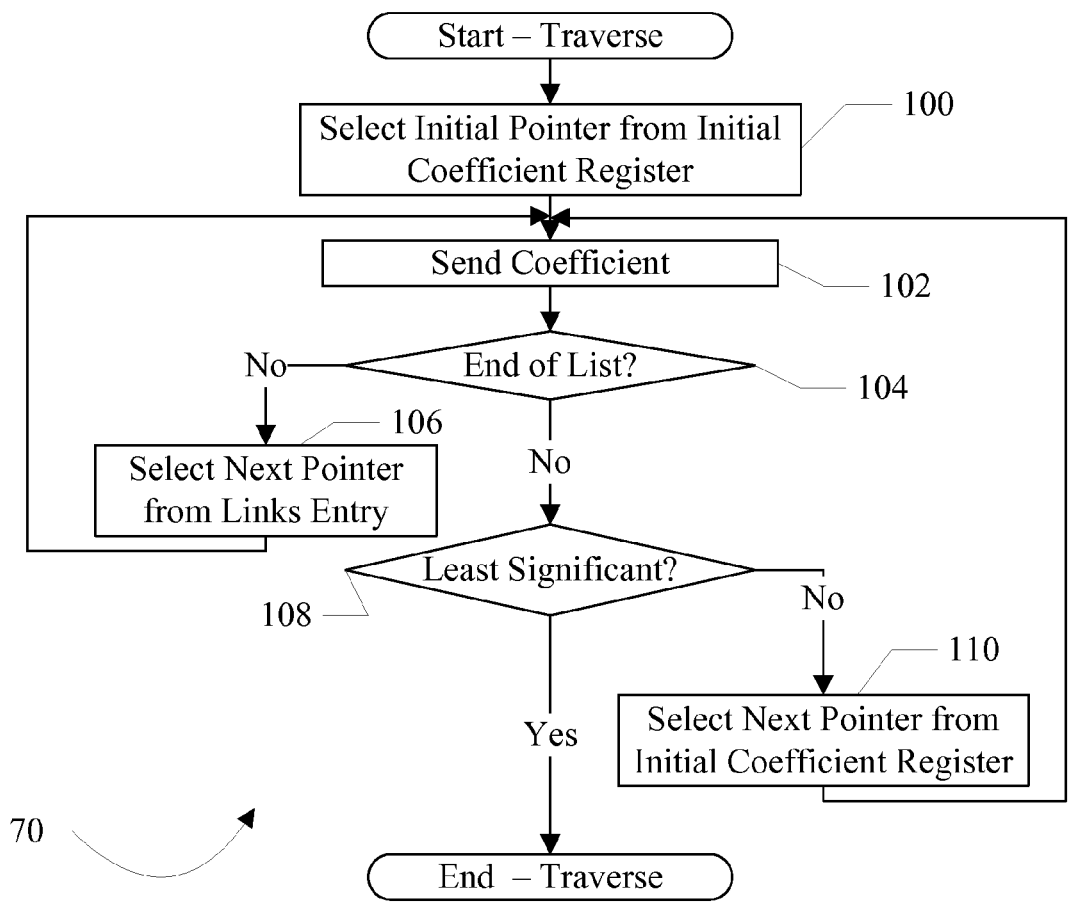
FIG. 9 is a flowchart illustrating additional detail of one embodiment of a traverse the linked lists block shown in FIG. 7.

FIG. 9 is a flowchart illustrating operation of one embodiment of the compression and transmit control circuit 54 to traverse the linked lists and send the remaining coefficients (block 70 in FIG. 7). The compression and transmit control circuit 54 may be configured to select the initial coefficient pointer for the second most significant significance group in the initial coefficient pointer register 56A (block 100). The compression and transmit control circuit 54 may be configured to check for a null pointer. If the pointer is null, the compression and transmit control circuit 54 may be configured to select the next most significant significance group until a non-null pointer is found. A null pointer in the initial coefficient pointer register 56A for a given significance group may indicate that the given significance group is empty.

The compression and transmit control circuit 54 may be configured to send the selected coefficient (block 102).

The compression and transmit control circuit 54 may be configured to read the next pointer from the entry corresponding to the selected coefficient in the coefficient links memory 58 (using the current pointer). If the next pointer is not null (decision block 104, "no" leg), the end of the linked list has not yet been reached. The compression and transmit control circuit 54 may be configured to select the next pointer from the coefficient links memory 58 to read the next coefficient for sending (block 106). On the other hand, if the next pointer is null (decision block 104, "yes" leg), the end of the current linked list has been reached. If the current significance group is the least significant significance group (decision block 108, "yes" leg), the processing of the coefficients is completed. Otherwise, the compression and transmit control circuit 54 may be configured to select the next non-null pointer in the initial coefficient pointer register 56A to select the next significance group to be sent (block 110), and processing may be continued.

It is noted that, by processing the coefficients from most significant to least significant as discussed above, it may be possible to perform lossy compression by terminating the sending of coefficients when the significance reduces below a threshold. That is, the significant coefficients have been transmitted prior to the termination, ensuring that the loss is maintained below a desired level. Similarly, transmission may be terminated when the total amount of data sent fills the space allocated for the compressed tile.

It is noted that the present embodiment may not send the coefficients that are equal to zero. Accordingly, a tile may be initialized to zero and then filled with the non-zero coefficients sent from the compression unit 16. The resultant tile (with zero coefficients in positions of the tile for which the compression unit 16 did not send data) may reproduce the original compressed tile, which may then be decompressed to produce the original tile.

Figure 10:
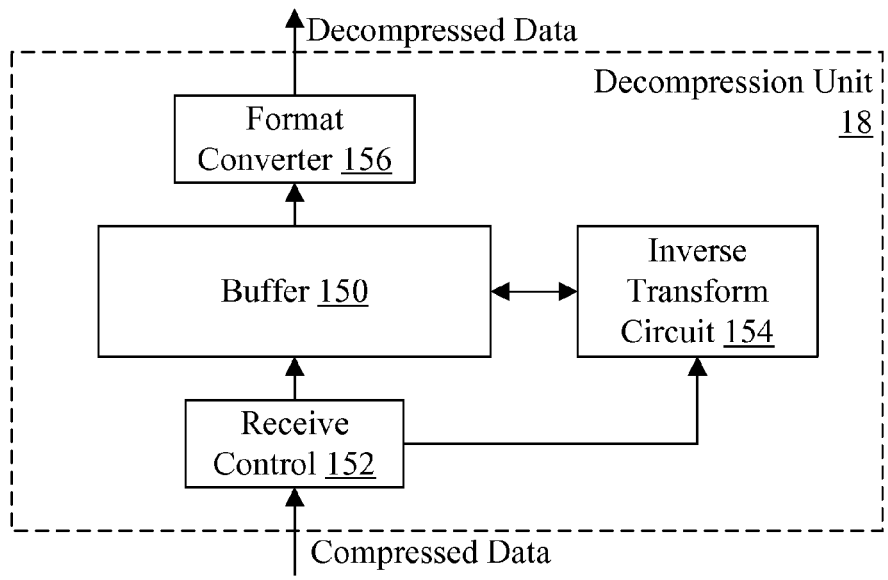
FIG. 10 is a block diagram of one embodiment of a decompression unit.

FIG. 10 is a block diagram of one embodiment of a decompression unit 18. In the embodiment of FIG. 10, the decompression unit 18 includes a buffer 150, a receive control circuit 152, an inverse transform circuit 154, and a format converter 156. The receive control circuit 152 is coupled to receive compressed data and is coupled to the buffer 150 and the inverse transform circuit 154. The inverse transform circuit 154 and the format converter 156 are coupled to the buffer 150 as well, and the format converter 156 is coupled to output decompressed data.

The buffer 150 may be configured to store a tile of data, or more than one tile, in various embodiments. Initially, the buffer 150 may store the list of coefficients received by the receive control circuit 152, and subsequently the data may be transformed back to the original tile data (or an approximation thereof, for lossy compression). Accordingly, the receive control circuit 152 may perform the decompression. The receive control circuit 152 may receive the compressed data (e.g. in the form of coefficient list addresses and coefficient values) and may reconstruct the transformed tile in the buffer 150. The inverse transform circuit 154 may be configured to apply the inverse of the transformations applied to the data by the compression unit 16, in the reverse order that the transformations were applied if more than one is used. The format converter 156 may be configured to convert the data to RGB format from YUV, and may be optional and not included in some embodiments if format conversion is not performed.

Figure 11:
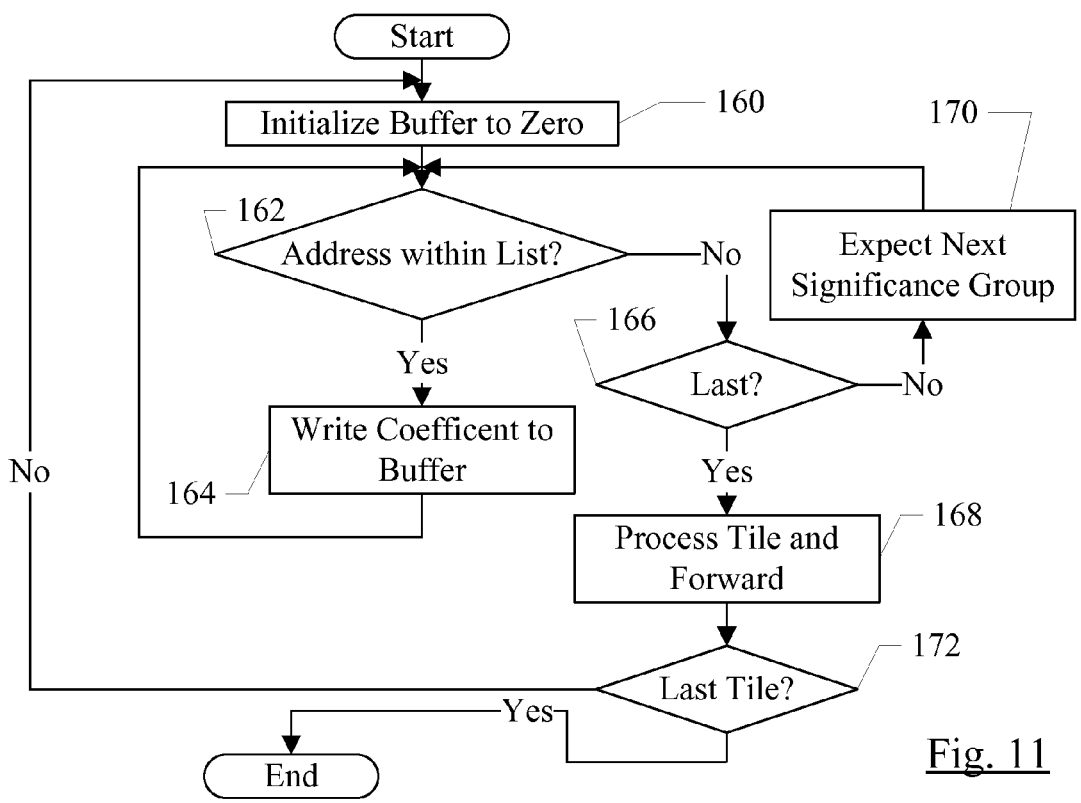
FIG. 11 is a flowchart illustrating operation of one embodiment of the decompression unit.

FIG. 11 is a flowchart illustrating operation of one embodiment of the decompression unit 18 shown in FIG. 10. While the blocks are shown in a particular order for ease of understanding, other orders may be used. Blocks may be performed in parallel in combinatorial logic in the decompression unit 18. Blocks, combinations of blocks, and/or the flowchart as a whole may be pipelined over multiple clock cycles. The decompression unit 18 may be configured to implement the operation illustrated by the flowchart.

The receive control circuit 152 may be configured to initialize the buffer 150 to zero (or to initialize one tile of space in the buffer 150, if the buffer 150 is larger than a tile) (block 160). As mentioned above, coefficients that are zero may not be sent, so initializing the tile to zero automatically fills the coefficient locations that are not sent with zero.

The receive control circuit 152 may decode the address (or delta address) of the next coefficient. If the address is within the coefficient list (i.e. the address identifies an entry within the list, rather than pointing beyond the end of the list or returning to the beginning of the list, modulo the length of the list, as discussed above) (decision block 162, "yes" leg), the receive control circuit 152 may map the address to a buffer location and may write the coefficient to the buffer 150 (block 164). In an embodiment, the most significant bit of the coefficient is an implied one and is not transmitted. The receive control circuit 152 may reinsert the most significant one to generate the original coefficient, and may write the reconstructed coefficient to the buffer 150.

If the address is beyond the end of the list or returns to the beginning of the list (decision block 162, "no" leg), the receive control circuit 152 may determine if the coefficient is the last coefficient of the tile (decision block 166). For example, a particular address beyond the end of the buffer may indicate that the tile is complete. If the coefficient is not the last coefficient of the tile (the tile is not complete) (decision block 166, "no" leg), the receive control circuit 152 may begin expecting the next significance group (block 170). On the other hand, if the coefficient is the last coefficient of the tile (the tile is competed) (decision block 166, "yes" leg), the decompression unit 18 may process the tile and forward the tile to other logic (block 168). For example, in the illustrated embodiment, the receive control circuit 152 may signal the inverse transform circuit 154 that the tile is completed. The inverse transform circuit 154 may transform the tile, and the format converter 156 may optionally convert the format. The decompression unit 18 may forward the resulting tile for further processing. If the tile is the last tile being sent (decision block 172, "yes" leg), the decompression unit 18 may be idle. Otherwise, the receive control unit 152 may initialize the buffer to zero (block 160) and proceed with the next-received tile.

FIG. 12 illustrates one embodiment of the conversion of an RGB format to a YUV format for one embodiment. Any formula may be used for Y in various embodiments, and formula 112 is merely an example of a conversion. In the illustrated embodiment, Y may be calculated for each pixel as the sum of R, twice G, B, and two. The sum may be right shifted by two bits. Two may be added in the sum to provide lossless compression and to ensure proper rounding after the right shift. Since Y is the sum of 4 pixel-sized values and is right shifted by two (dividing by 4), Y may be normalized to a pixel value. Thus, U (defined as B-Y in this example) and V (defined as R-Y) may be near zero in some instances (e.g. when text is in the image, since the text is often black on a white background).

The equations 114 in FIG. 12 illustrate the inverse operation, converting from the YUV format to the RGB format after previously applying the equations 112 to generate the YUV format. The conversion represented by the equations 112 and 114 may be lossless, although transformations of the data while represented in the YUV form may be lossy in some cases.

Figures 13, 14:
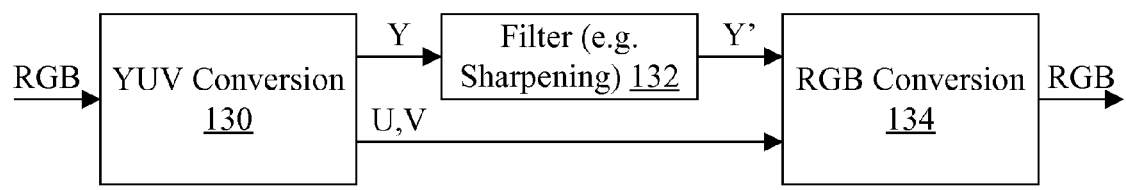
FIG. 13 is a block diagram illustrating one embodiment of filtering of RGB data.
FIG. 14 is a diagram illustrating an embodiment of format conversion for a Bayer sensor output.

As mentioned previously, converting to YUV format may reduce the amount of compression work to be performed, when U and V are both near zero. However, such an observation is not limited to compression applications. In general, any filtering of the data may be applied only to the Y component of the YUV format (and the result converted back to RGB) to effectively apply the filter to all three RGB components. FIG. 13 is a block diagram illustrating such a generic filter. The filter may be transparent to RGB on both input and output in FIG. 13. The filter includes a YUV conversion unit 130, which may convert the RGB data to YUV data according to the equations 112 shown in FIG. 12. The resulting Y data may be operated upon by a filter 132 (e.g. a sharpening filter, or any other filter that performs image enhancement or modification). The filter 132 may also perform the compression and decompression as described herein. In general, the filter 132 may perform any combination of operations such as sharpening, other image enhancement or modification, and/or compression/decompression. The filter may not operate upon the U and V data. However, in cases in which a substantial portion of the RGB data is represented in the Y component (and thus the U and V components are substantially zero or near zero), the application of the filter to the Y component may have the approximate effect of performing the filter 132 on all three of the R, G, and B components of the RGB representation. The output of the filter 132 (a Y' component) along with the unmodified U and V components may be input to the RGB conversion unit 134. The conversion from RGB to YUV and back to RGB may be lossless.

It is noted that the conversion, filtering, and reconversion of data may be implemented on any representation. For example, a Bayer output from a sensor may have four components: Red (R), Green from the green sensor on the red row of the Bayer sensor (Gr), Blue (B), and Green from the green sensor on the blue row of the Bayer sensor (Gb). Such a representation may be converted to, e.g., the YUVW components illustrated as equations 140 in FIG. 14. Accordingly, a frame may generally be represented using a variety of pixel formats, or pixel representations. Each format may include one or more color components, the value of which represents the contribution of the corresponding color to the pixel. Some pixel formats, such as RGB, may tend to have relatively dense populations of non-zero pixel data in each color component. Other formats, such as the YUV format, may concentrate color content in one or more color components and other components may be sparser. Color components may also be referred to as color planes or pixel planes. A set of color components may also be referred to as a color space.

As mentioned previously, the increase in image footprint sizes and increased bandwidth needs pressures the components of a system that process the image data. By including compression and decompression functionality in these components and transmitting/storing compressed data, the pressure may be reduced. In an embodiment, the storage that is saved by transmitting compressed image data may be retained or "banked" and used for other portions of the image that do not compress as well. For example, in some cases, the compressed frame buffer 28 in memory may not be as large as a full-sized frame buffer. As each tile is compressed and some numbers of the coefficients are found to be zero, the zero coefficients may be dropped and only the non-zero coefficients may be stored in the compressed frame buffer 28. Each tile that compresses to smaller than the ratio of the compressed frame buffer size to the full size frame buffer size uses less space than would otherwise be available for that tile. The unused space for each compressed tile may be saved as a running tally of space that may be used for other tiles that do not compress to the ratio. By using the unused space from previous tiles to store data for tiles that do not compress as well, a smaller-than-full-size frame buffer may still losslessly store frames that compress well overall, even if some tiles do not compress well. As a specific example, a compressed frame buffer 28 may be allocated at ½ of the full frame buffer size. Each tile that compresses by more than ½ leaves space that may be used to store data for tiles the compress by less than one half.

Furthermore, compression/decompression functionality may serve as a risk reduction mechanism if the bandwidth/storage pressures are underestimated. In such cases, the system may operate incorrectly when placed under stress. A system experiencing incorrect operation may be salvaged by increasing the compression ratio of image data in the system.

Figure 15:
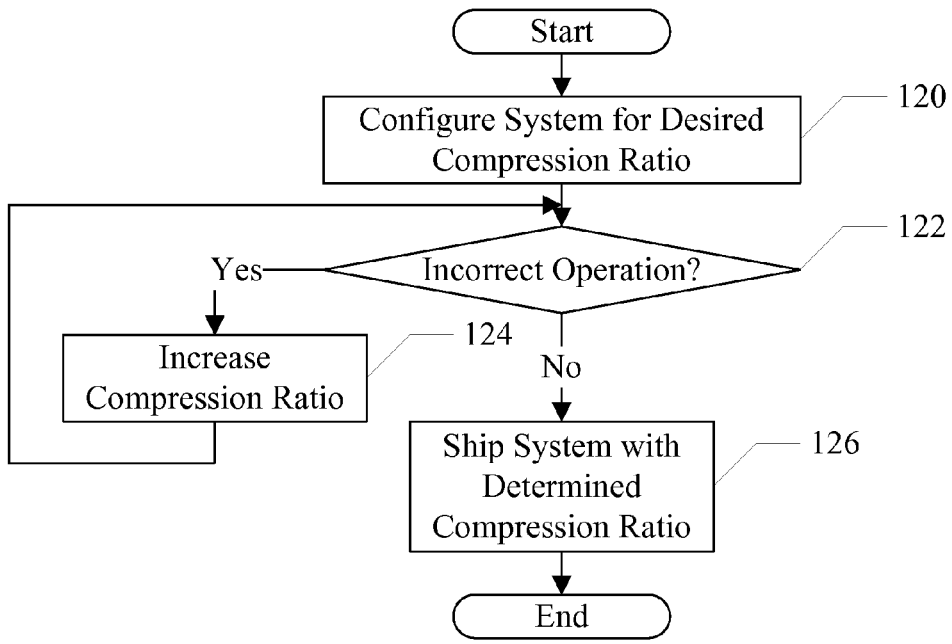
FIG. 15 is a flowchart illustrating use of the image compression scheme discussed herein in one embodiment.

FIG. 15 is a flowchart illustrating such a method. The system may initially be configured for a desired compression ratio (block 120). The system may be tested, and if incorrect operation is detected (decision block 122, "yes" leg), the compression ratio may be increased (block 124). The system may be tested again until incorrect operation is no longer detected (decision block 122, "no" leg). The (now functional) system may be shipped with the determined compression ratio, preventing the need to scrap the product. Subsequently, the design of the product may be corrected. When the corrected device is proven to function well at the desired compression ratio, the shipped compression ratio may be reduced to the desired compression ratio. A similar process may be performed dynamically to compensate for variations in bandwidth and/or memory pressures. For example, a system may be executing an application using a first compression ratio. If an additional application is started, increasing the pressure on bandwidth and/or memory, the first compression ratio may be increased to a higher compression ratio to reduce pressure. Similarly, if an application is terminated, the compression ratio in effect may be lowered due to the easing pressure on bandwidth and/or memory. In another embodiment, an image may be statically compressed using a high compression ratio to reduce power in instances where the quality of the image is not deemed to be as critical. Such instances may include, for example, a dimmed image displayed before transition to standby or other times that are perceived to be idle times by a user.

Figure 16:
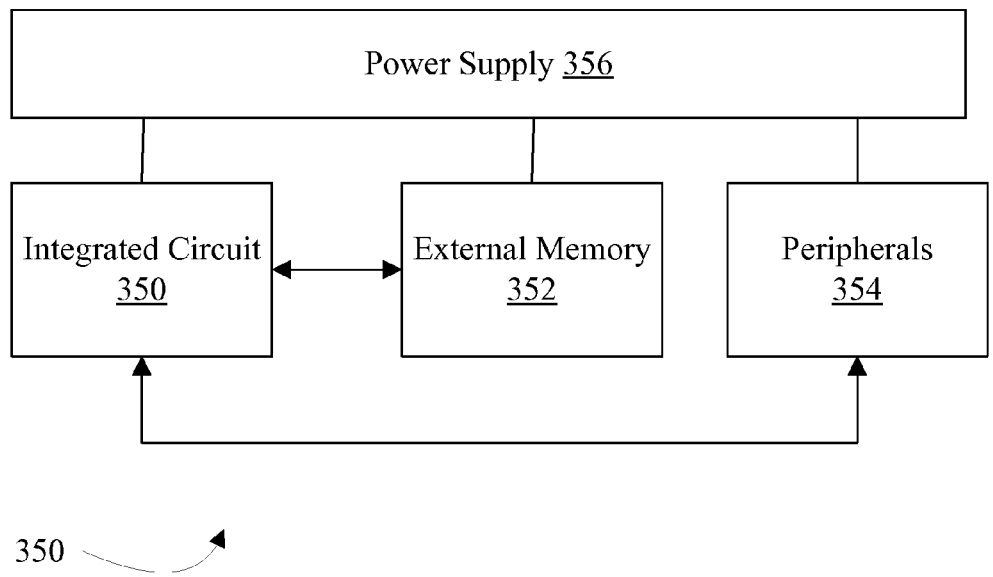
FIG. 16 is a block diagram of one embodiment of a system.

Turning next to FIG. 16, a block diagram of one embodiment of a system 350 is shown. In the illustrated embodiment, the system 350 includes at least one instance of the integrated circuit 350 coupled to an external memory 352. The external memory 352 may include the memory 24 illustrated in FIG. 2. The integrated circuit 350 may include the components illustrated in FIG. 2 and/or other components. The integrated circuit 350 is coupled to one or more peripherals 354 and the external memory 352. A power supply 356 is also provided which supplies the supply voltages to the integrated circuit 350 as well as one or more supply voltages to the memory 352 and/or the peripherals 354. In some embodiments, more than one instance of the integrated circuit 350 may be included (and more than one external memory 352 may be included as well).

The peripherals 354 may include any desired circuitry, depending on the type of system 350. For example, in one embodiment, the system 350 may be a mobile device (e.g. personal digital assistant (PDA), smart phone, etc.) and the peripherals 354 may include devices for various types of wireless communication, such as wifi, Bluetooth, cellular, global positioning system, etc. The peripherals 354 may also include additional storage, including RAM storage, solid state storage, or disk storage. The peripherals 354 may include user interface devices such as a display screen, including touch display screens or multitouch display screens, keyboard or other input devices, microphones, speakers, etc. In other embodiments, the system 350 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:

1. A compression unit comprising:
   a data buffer coupled to receive image data;
   a transform circuit coupled to the data buffer and configured to transform the image data in the data buffer according to one or more transformation algorithms, wherein a result of the one or more transformation algorithms is a set of coefficients;
   a coefficient links memory configured to store pointers to coefficients in the set of coefficients;
   a plurality of registers configured to store initial coefficient pointers and last coefficient pointers; and
   a control circuit coupled to the data buffer, the coefficient links memory, and the plurality of registers, wherein the control circuit is configured to generate a linked list of coefficients for each significance group in the set of coefficients using the coefficient links memory and the plurality of registers, wherein coefficients in a given significance group have a same combination of one or more most significant set bits dependent on a sign bit, and wherein the control circuit is configured to transmit the coefficients by traversing the linked lists for each significance group.

2. The compression unit as recited in claim 1 wherein the control circuit is configured to update the initial coefficient pointer for a first significance group in the plurality of registers with a first pointer to an initial coefficient for the first significance group in the set of coefficients.

3. The compression unit as recited in claim 1 wherein the control circuit is further configured to update the last coefficient pointer corresponding to the first significance group in the plurality of registers with the first pointer.

4. The compression unit as recited in claim 3 wherein the control circuit is further configured to read the last coefficient pointer from the plurality of registers responsive to detecting a second coefficient from the first significance group, and wherein the control circuit is configured to update the coefficient links memory to include a pointer to the second coefficient in the set of coefficients responsive to the last coefficient pointer.

5. The compression unit as recited in claim 4 wherein the control circuit is configured to update an entry in the coefficient links memory that is assigned to the first coefficient responsive to the last coefficient pointer equaling the first pointer.

6. The compression unit as recited in claim 4 wherein the control circuit is configured to update the last coefficient pointer for the first significance group with the second pointer.

7. The compression unit as recited in claim 6 wherein the control circuit is further configured to read the last coefficient pointer from the plurality of registers responsive to detecting a third coefficient from the first significance group, and wherein the control circuit is configured to update the coefficient links memory to include a pointer to the third coefficient in the set of coefficients responsive to the last coefficient pointer.

8. The compression unit as recited in claim 7 wherein the control circuit is configured to update an entry in the coefficient links memory that is assigned to the second coefficient responsive to the last coefficient pointer equaling the second pointer.

9. The compression unit as recited in claim 7 wherein the control circuit is configured to update the last coefficient pointer for the first significance group with the third pointer.

10. The compression unit as recited in claim 6 wherein the control circuit is configured to traverse a first linked list corresponding to the first significance group, including reading the initial coefficient pointer that corresponds to the first significance group from the plurality of registers, reading the initial coefficient at the initial coefficient pointer from the set of coefficients, transmitting the initial coefficient, reading the coefficient links memory at the entry assigned to the initial coefficient, reading the second coefficient from the set of coefficients at the second pointer, and processing the coefficient from the links memory entry in a same fashion as the initial coefficient.

11. A method comprising:
   receiving image data into a data buffer in a compression unit;
   transforming the image data in the data buffer according to one or more transformation algorithms by a transform circuit, wherein a result of the one or more transformation algorithms is a set of coefficients;
   generating a linked list of coefficients for each significance group in the set of coefficients, wherein coefficients in a given significance group have a same combination of one or more most significant set bits dependent on a sign bit; and
   transmitting the coefficients by traversing the linked lists for each significance group;
   wherein generating the linked list comprises:
      updating an initial coefficient pointer for a first significance group in a plurality of registers in the compression unit with a first pointer to an initial coefficient for a first significance group in the set of coefficients;

updating a last coefficient pointer in the plurality of registers with the first pointer;

reading the last coefficient pointer from the plurality of registers responsive to detecting a second coefficient from the first significance group; and updating a coefficient links memory to include a second pointer to the second coefficient in the set of coefficients responsive to the last coefficient pointer.

12. The method as recited in claim 11 wherein an entry assigned to the first coefficient in the coefficient links memory is updated with the second pointer responsive to the last coefficient pointer equaling the first pointer.

13. The method as recited in claim 11 further comprising updating the last coefficient pointer for the first significance group with the second pointer.

14. The method as recited in claim 13 further comprising:

detecting a third coefficient from the first significance group;

reading the last coefficient pointer from the plurality of registers responsive to detecting the third coefficient; and updating the coefficient links memory to include a third pointer to the third coefficient in the set of coefficients responsive to the last coefficient pointer.

15. The method as recited in claim 14 wherein the entry assigned to the second coefficient in the coefficient links memory is updated with the third pointer responsive to the last coefficient pointer equaling the second pointer.

16. The method as recited in claim 14 further comprising updating the last coefficient pointer for the first significance group with the third pointer.

17. The method as recited in claim 11 further comprising traversing a first linked list corresponding to the first significance group, the traversing comprising:

reading the initial coefficient pointer that corresponds to the first significance group from the plurality of registers;

reading the initial coefficient at the initial coefficient pointer from the set of coefficients;

transmitting the initial coefficient;

reading the second pointer from the coefficient links memory at the entry assigned to the initial coefficient;

reading the second coefficient from the set of coefficients at the second pointer; and processing the second coefficient from the links memory entry in a same fashion as the first coefficient.

18. The method as recited in claim 11 wherein the transforming comprises overwriting the image data in the data buffer with the set of coefficients.

* * * * *